United States Patent
Kim et al.

(10) Patent No.: US 10,564,913 B2
(45) Date of Patent: Feb. 18, 2020

(54) DISPLAY DEVICE OF MULTI-DISPLAY SYSTEM AND CONTROL METHOD THEREOF

(71) Applicant: SAMSUNG ELECTRONICS CO., LTD., Suwon-si (KR)

(72) Inventors: Dong-jin Kim, Suwon-si (KR); Jung-keun Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 238 days.

(21) Appl. No.: 15/295,286

(22) Filed: Oct. 17, 2016

(65) Prior Publication Data

US 2017/0115946 A1 Apr. 27, 2017

(30) Foreign Application Priority Data

Oct. 22, 2015 (KR) .................. 10-2015-0147296

(51) Int. Cl.
| | |
|---|---|
| *G06F 3/147* | (2006.01) |
| *G06F 3/14* | (2006.01) |
| *G09G 5/00* | (2006.01) |
| *G09G 5/12* | (2006.01) |

(52) U.S. Cl.
CPC ............ *G06F 3/1446* (2013.01); *G06F 3/147* (2013.01); *G09G 5/006* (2013.01); *G09G 5/12* (2013.01); *G09G 2300/026* (2013.01); *G09G 2340/14* (2013.01); *G09G 2356/00* (2013.01); *G09G 2370/042* (2013.01); *G09G 2370/12* (2013.01)

(58) Field of Classification Search
CPC ....... G06F 3/1446; G06F 3/147; G09G 5/006; G09G 5/12; G09G 2370/12; G09G 2356/00; G09G 2370/042; G09G 2340/14; G09G 2300/026
See application file for complete search history.

(56) References Cited

U.S. PATENT DOCUMENTS

| | | | |
|---|---|---|---|
| 2008/0211825 A1* | 9/2008 | Sunakawa | G06F 3/1446 345/581 |
| 2011/0122048 A1* | 5/2011 | Choi | G06F 3/1446 345/1.1 |

(Continued)

FOREIGN PATENT DOCUMENTS

| | | |
|---|---|---|
| JP | 4234776 B1 | 3/2009 |
| JP | 2013-205821 A | 10/2013 |

(Continued)

*Primary Examiner* — Carolyn R Edwards
(74) *Attorney, Agent, or Firm* — Sughrue Mion, PLLC

(57) ABSTRACT

A display device of a multi-display system includes a display; a communicator configured to receive a divided image that is displayed on the display device, of a whole image that is displayed through a plurality of display devices included in the multi-display system; a storage configured to store the received divided image; and a processor configured to perform, when a reference image that is synchronized with the divided image is received, at least one among an operation for displaying the divided image that is stored in the storage on the basis of synchronization information that is extracted from the reference image and an operation for transmitting the reference image to another display device among the plurality display devices of the multi-display system.

11 Claims, 9 Drawing Sheets

(56) References Cited

U.S. PATENT DOCUMENTS

| 2015/0145892 | A1* | 5/2015 | Hong | G06F 3/1446 |
| | | | | 345/649 |
| 2015/0187333 | A1* | 7/2015 | Loeffler | G06F 3/1438 |
| | | | | 345/1.3 |

FOREIGN PATENT DOCUMENTS

| KR | 10-0839953 B1 | 6/2008 |
| KR | 10-2015-0047225 A | 5/2015 |

\* cited by examiner

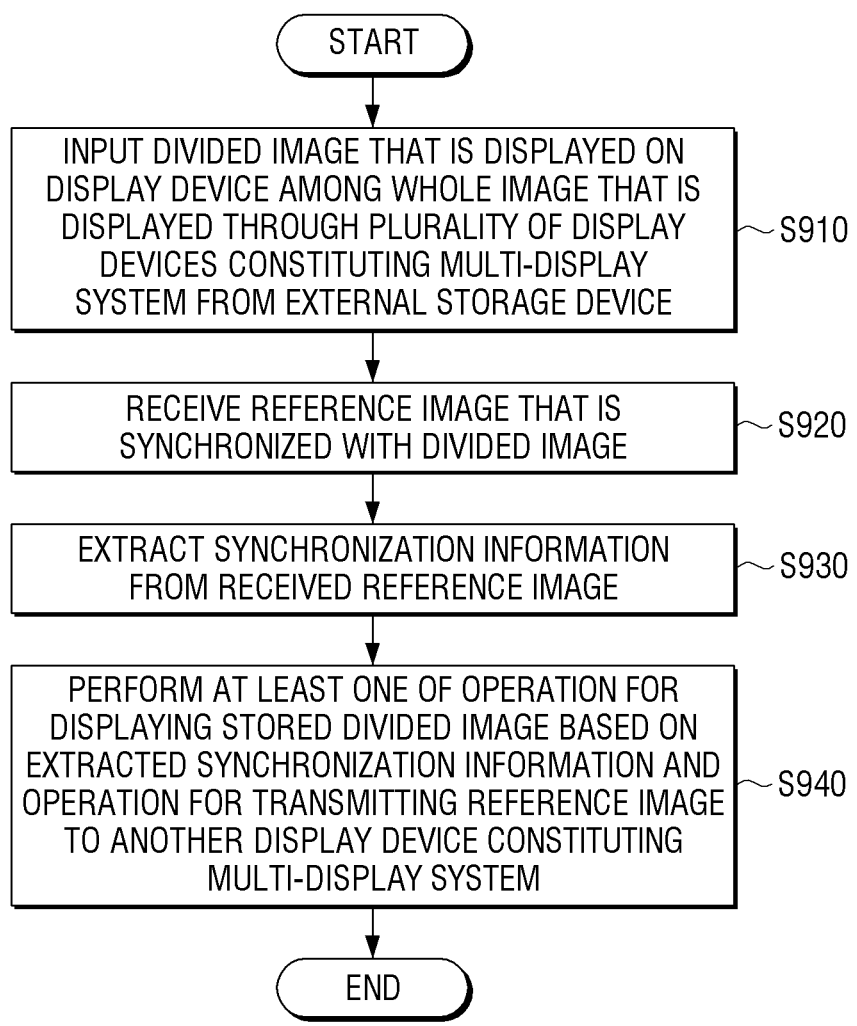

DISPLAY DEVICE OF MULTI-DISPLAY SYSTEM AND CONTROL METHOD THEREOF

CROSS-REFERENCE TO RELATED APPLICATION

This application claims priority from Korean Patent Application No. 10-2015-0147296 filed on Oct. 22, 2015 in the Korean Intellectual Property Office, the disclosure of which is incorporated herein by reference in its entirety.

BACKGROUND

Field

The present disclosure relates to a display device and a control method thereof, and more particularly, to a display device of a multi-display system in association with at least one display device and a control method thereof.

Description of the Related Art

In general, a display device is a device that displays one or more images on one screen. However, the display device may be connected to a plurality of display devices and may perform a multi-display function to display an image on a plurality of screens. A representative example of such a multi-display system may be a video wall system.

A video wall is provided by arranging a plurality of display devices that can output images on plane and making the plurality of display devices output respective parts of one image, and thus the plurality of display devices act as one display device having a large screen. For example, the video wall operates in a manner that the respective display devices that constitute the video wall in an advertisement, entertainment, spot, broadcast, exhibition hall, or the like simultaneously display the same image or display different images that are combined into one whole image.

Video wall implementation methods may include a method, in which if the whole image is input to one of a plurality of display devices, the corresponding display device divides and displays only an image to be displayed thereon, and transmits the whole image to the next-order display device connected thereto, and a method, in which a source device or a server transmits divided images to a plurality of display devices that constitute a video wall, and the plurality of display devices display the respective divided images at the same time using clock information of the server.

The latter method reproduces the divided images that are stored in a storage medium, and thus has an advantage that high-quality image output becomes possible even in a video wall composed of 2×2 or more display devices. However, since it is difficult to accurately match a time required to output the divided images on the respective display devices only through the clock information that is received from the server, the latter method has the problem that a step height occurs between the respective display devices.

Accordingly, there has been a need for schemes to solve the step height problem that occurs between the respective display devices.

SUMMARY OF THE INVENTION

Exemplary embodiments overcome the above disadvantages and other disadvantages not described above, and provide a display device and a control method thereof, which can prevent step heights from occurring on a plurality of display devices that constitute a multi-display system.

According to an aspect of an exemplary embodiment, there is provided a display device of a multi-display system, the display device including: a display; a communicator configured to receive, from a server, a divided image to be displayed on the display device, the divided image being one of divided images of a whole image that is displayed through a plurality of display devices included in the multi-display system; a storage configured to store the received divided image; and a processor configured to perform, when a first reference image that is synchronized with the divided image is received, at least one among an operation for displaying the divided image that is stored in the storage based on synchronization information that is extracted from the first reference image and an operation for transmitting a second reference image to another display device among the plurality of display devices included in the multi-display system.

The display device may further include: a first connector connected to a first display device among the plurality of display devices; and a second connector connected to a second display device among the plurality of display devices, the second display device being the another display device, wherein the processor is configured to receive the first reference image from the first display device through the first connector, and transmit the second reference image to the second display device through the second connector.

The display device may be positioned adjacent to the first connector of the first display device and the second connector of the second display device.

The first reference image that is received from the first display device may be a divided image, among the divided images, that is displayed on the first display device, and the second reference image that is transmitted to the second display device may be the divided image that is displayed on the display device.

The first reference image that is received from the first display device and the second reference image that is transmitted to the second display device may be the divided images that are displayed on the display device in a first order among the plurality of display devices that successively transmit reference images.

The first connector and the second connector may include at least one among a Display Port (DP) connector, a Digital Visual Interface (DVI) connector, and a High Definition Multimedia Interface (HDMI) connector.

The synchronization information may include at least one among vertical synchronization (V-sync) information, horizontal synchronization (H-sync) information, and clock information.

According to an aspect of another exemplary embodiment, there is provided a display device of a multi-display system, the display device including: a display; an input terminal configured to receive, from an external storage device, an input of a divided image to be displayed on the display device, the divided image being one of divided images of a whole image that is displayed through a plurality of display devices included in the multi-display system; and a processor configured to perform, when a reference image that is synchronized with the divided image is received, at least one among an operation for displaying the divided image that is input from the external storage device based on synchronization information that is extracted from the reference image and an operation for transmitting the reference image to another display device among the plurality of display devices included in the multi-display system.

According to an aspect of another exemplary embodiment, there is provided a method for controlling a display device of a multi-display system, the method including: receiving, from a server, a divided image to be displayed on the display device, the divided image being one of divided images of a whole image that is displayed through a plurality of display devices included in the multi-display system; storing the received divided image; receiving a first reference image that is synchronized with the divided image; extracting synchronization information from the received first reference image; and performing at least one among an operation for displaying the stored divided image based on the extracted synchronization information and an operation for transmitting a second reference image to another display device among the plurality of display devices included in the multi-display system.

The receiving the first reference image may include receiving the first reference image from a first display device through a first connector connected to the first display device among the plurality of display devices, and the performing the operation for transmitting the second reference image may include transmitting the second reference image to a second display device through a second connector connected to the second display device among the plurality of display devices.

The display device may be adjacent to the first connector of the first display device and to the second connector of the second display device.

The first reference image that is received from the first display device may be a divided image that is displayed on the first display device, and the second reference image that is transmitted to the second display device may be the divided image that is displayed on the display device.

The first reference image that is received from the first display device and the second reference image that is transmitted to the second display device may be the divided images that are displayed on the display device in a first order among the plurality of display devices that successively transmit reference images.

The first connector and the second connector may include at least one among a Display Port (DP) connector, a Digital Visual Interface (DVI) connector, and a High Definition Multimedia Interface (HDMI) connector.

The synchronization information may include at least one among vertical synchronization (V-sync) information, horizontal synchronization (H-sync) information, and clock information.

BRIEF DESCRIPTION OF THE DRAWING

The above and/or other aspects will be more apparent by describing certain exemplary embodiments with reference to the accompanying drawings, in which:

FIG. 9 is a flowchart explaining a method for controlling a display device of a multi-display system according to another exemplary embodiment.

DETAILED DESCRIPTION OF THE EXEMPLARY EMBODIMENTS

Figure 1:
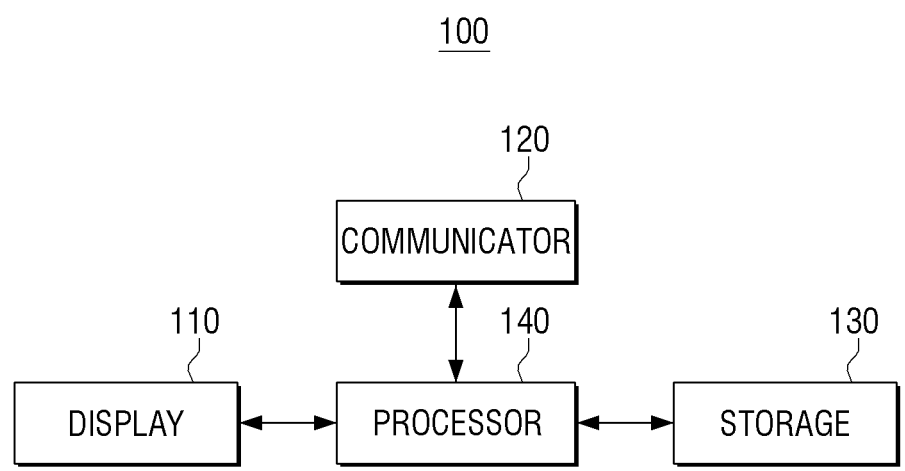
FIG. 1 is a block diagram schematically illustrating the configuration of a display device of a multi-display system according to an exemplary embodiment.

Exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit. Also, well-known functions or constructions are not described in detail since they would obscure the disclosure with unnecessary detail.

Hereinafter, exemplary embodiments will be described in detail with reference to the accompanying drawings.

FIG. 1 is a block diagram schematically illustrating the configuration of a display device of a multi-display system according to an exemplary embodiment.

Referring to FIG. 1, a display device 100 according to an exemplary embodiment includes a display 110, a communicator 120, a storage 130, and a processor 140.

The display device 100 may be connected to one or more other display devices to constitute a multi-display system that can display one image or a plurality of images on a plurality of screens. The display device 100 may include not only devices that are fixedly arranged in specific places, such as a TV and a desk top PC, but also various types of devices that can be easily carried by individuals to output specific image signals, such as a PDA, a PMP, and a portable terminal.

The display 110 is configured to display an image based on an image signal that is processed by the processor 140. The display 110 may include various types of displays that can display images, such as a cathode ray tube (CRT), a liquid crystal display (LCD), a light emitting diode (LED) display, and a plasma display panel (PDP). The display 110 may additionally include an additional configuration in accordance with its implementation type. For example, in the case where the display 110 is of a liquid crystal type, it may include an LCD panel, a backlight unit that supplies light to the LCD panel, and a panel driver board that drives the LCD panel.

The communicator 120 is configured to perform communication with a server 10 in accordance with various communication types. Here, the server 10 may be connected to the display device 100 by wire or wirelessly to be implemented as a source device that transmits divided images corresponding to respective display devices.

The communicator 120 may include a Wi-Fi chip, a Bluetooth chip, and a wireless communication chip. The processor 140 may perform communication with the server 10 using the communicator 120. In particular, the Wi-Fi chip and the Bluetooth chip perform communication in Wi-Fi and Bluetooth types, respectively. In the case of using the Wi-Fi chip or the Bluetooth chip, various kinds of connection information, such as SSIDs and session keys, are transmitted or received, and various kinds of information can be transmitted after communication connection using the connection information. The wireless communication chip may perform communication in accordance with various communication standards, such as IEEE, ZigBee, $3^{rd}$ Generation (3G), $3^{rd}$ Generation Partnership Project (3GPP), and Long Term Evolution (LTE).

Here, the server 10 is a source device that can transmit divided images to respective display devices, and may correspond to a personal computer (PC), a digital versatile disc (DVD) player, a Blu-ray Disc (BD) player, a personal video recorder (PVR), or a web server.

On the other hand, the communicator 120 may receive a divided image that is displayed on the display device 100 among a whole image that is displayed through a plurality of display devices included in the multi-display system from the server 10. That is, in the case where the plurality of display devices of the multi-display system operate like one screen to display one image thereon, the server 10 may transmit divided images, of which the number corresponds to the number of display devices, for one image to the display devices corresponding to the respective divided images, and thus the communicator 120 may receive the corresponding divided image.

The storage 130 is configured to store the divided image that is received from the server 10. The processor may operate to store the divided image in the storage 130 and to display the divided image that is synchronized with a reference image that is input thereafter.

The processor 140 is configured to control the whole operation of the display device 100. The processor 140 may be implemented by a System on Chip (SoC).

If the reference image that is synchronized with the divided image is received, the processor may extract synchronization information from the received reference image, and may perform at least one of an operation for displaying the divided image that is stored in the storage 130 on the basis of the extracted synchronization information and an operation for transmitting the reference image to another display device of the multi-display system.

For example, a first display device among the plurality of display devices of the multi-display system may transmit the reference image that is synchronized with the divided image that is displayed on the first display device to the display device 100. Here, the reference image may be a divided image that is displayed on a display device in a first order among the plurality of display devices that are successively connected to each other.

The processor 140 may extract the synchronization information from the received reference image, and may display the divided image that is stored in the storage 130 on the basis of the extracted synchronization information. Here, the synchronization information may be at least one of vertical synchronization (V-sync) information, horizontal synchronization (H-sync) information, and clock information of the received reference image. Here, the processor 140 may perform frame lock synchronization.

Specifically, the processor 140 may extract at least one of the vertical synchronization (V-sync) information, the horizontal synchronization (H-sync) information, and the clock information from the received reference image, and may control a display period of the divided image so that the divided image has a frame that is synchronized with the reference image using any one of the extracted vertical synchronization information, horizontal synchronization information, and clock information.

Since the reference image is transmitted to the display device 100 at the same time the divided image that corresponds to the first display device is displayed on the first display device, the processor 140 can display the divided image that is synchronized with the divided image that is displayed on the first display device on the basis of time information when the reference image is received and the synchronization information.

On the other hand, the processor 140 may operate to display the synchronized divided image on the basis of the extracted synchronization information and simultaneously to transmit the reference image to a second display device among the plurality of display devices of the multi-display system. For example, the divided image, which is displayed on the display device in a first order among the plurality of display devices that are successively connected to each other, may be successively transmitted to the plurality of display devices as the reference image. In this case, each of the respective display devices may display the divided image that is synchronized with the divided image that is displayed on the previous display device on the basis of the time information when the reference image is received and the synchronization information that is extracted from the received reference image.

On the other hand, the display device 100 may further include a first connector 160 connected to the first display device among the plurality of display devices of the multi-display system and a second connector 170 connected to the second display device among the plurality of display devices of the multi-display system. In this case, the processor 140 may receive the reference image from the first display device through the first connector 160, and may transmit the reference image to the second display device through the second connector 170.

In this case, the first display device and the second display device may be display devices that are adjacent to the display device 100 through the first connector 160 and the second connector 170, respectively. That is, the first display device may be a display device that transmits the reference image through the first connector 160 in the previous direction of the display device 100 among the adjacent display devices that are successively connected to the display device 100.

Further, the second display device may be a display device that receives the reference image through the second connector 170 in the subsequent direction of the display device 100 among the adjacent display devices that are successively connected to the display device 100.

The first connector 160 is configured to receive an input of the reference image from the adjacent display device. Here, the first connector 160 may include at least one daisy chain source of a Digital Visual Interface (DVI), Display Port (DP), a High Definition Multimedia Interface (HDMI), and component, which can receive an input of an image signal.

The first connector 160 may include an input port for controlling the display device in addition to the daisy chain source for receiving the above-described reference image. Further, the first connector 160 may include a detection port for confirming a connection to a surrounding display device, and if needed, may further include various input ports.

The second connector 170 is configured to transmit the reference image to the adjacent display device. In the same manner, the second connector 170 may include at least one daisy chain source of DVI, DP, HDMI, and component.

As another embodiment, the reference image that is transmitted from the first display device to the display device 100 may be a divided image that is displayed on the first display device, and the reference image that is transmitted to the second display device may be a divided image that is displayed on the display device 100. That is, the plurality of display devices of the multi-display system may transmit the divided images that are displayed on the respective display devices to other display devices (adjacent next display devices) as the reference images.

Figure 2:
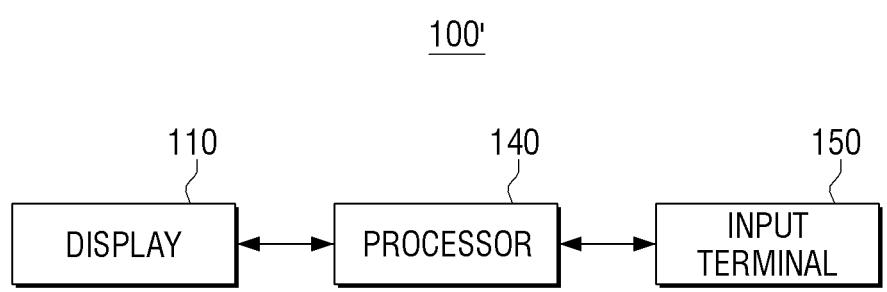
FIG. 2 is a block diagram schematically illustrating the configuration of a display device of a multi-display system according to another exemplary embodiment.

FIG. 2 is a block diagram schematically illustrating the configuration of a display device of a multi-display system according to another exemplary embodiment.

Referring to FIG. 2, a display device 100' according to another exemplary embodiment may include a display 110, a processor 140, and an input terminal 150, and the configurations of a communicator 120 that receives divided images from the server and a storage 130 that stores the received divided images therein may be omitted. Hereinafter, explanation of the duplicate configurations in FIG. 1 will be omitted.

As illustrated in FIG. 2, the display device 100' may further include the input terminal 150. The input terminal 150 is configured to receive an input of divided images from an external storage device.

The external storage device may be any one of a USB flash drive, an SD memory card, a memory stick, an solid state drive (SSD), an external hard disk drive (HDD), a multimedia card (MMC), and an xD-picture card. The divided images are stored in the external storage device in the form of several kinds of files.

The input terminal 150 may receive an input of a divided image that is displayed on the display device 100' among a whole image that is displayed through a plurality of display devices of the multi-display system from an external storage device.

If a reference image that is synchronized with the divided image is received, the processor 140 may extract synchronization information from the received reference image, and may perform at least one of an operation for displaying the divided image that is input from the external storage device on the basis of the extracted synchronization information and an operation for transmitting the reference image to another display device of the multi-display system. Further, the processor 140 may operate to transmit the reference image to a second display device.

Figure 3:
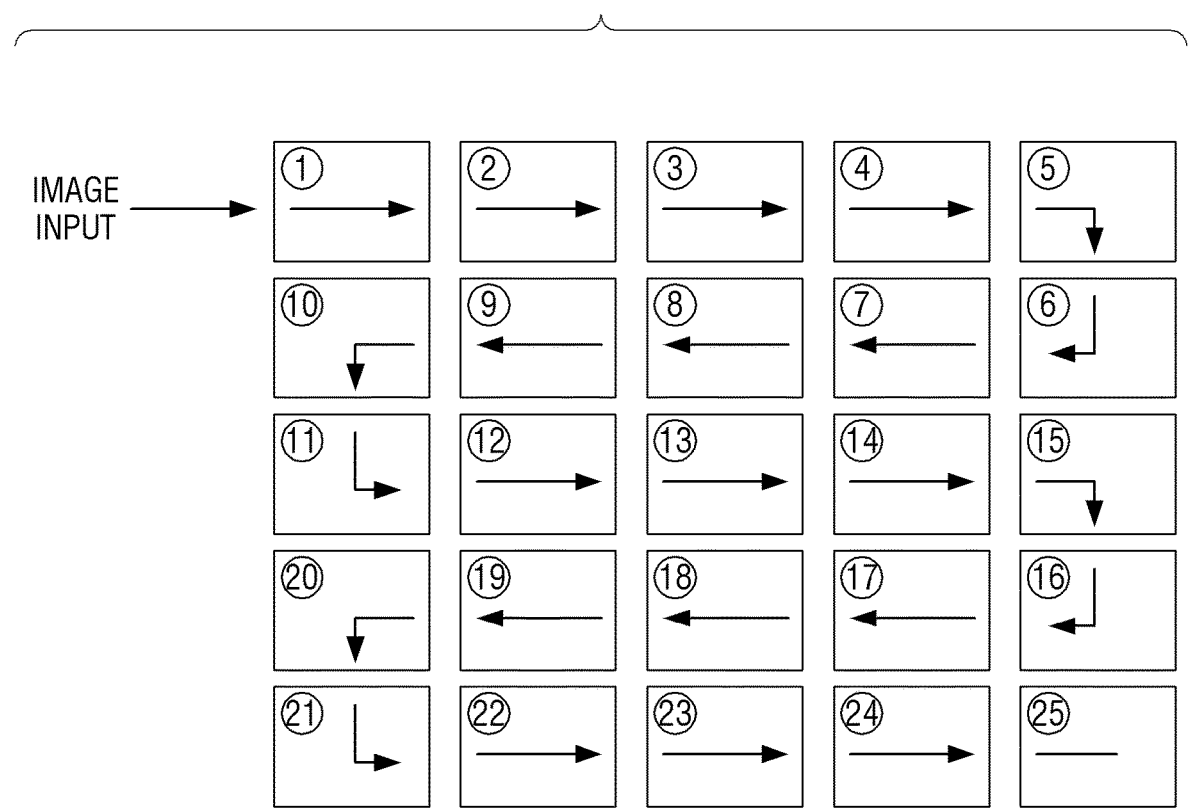
FIG. 3 is a diagram explaining a transmission order of a reference image for synchronization according to an exemplary embodiment.

FIG. 3 is a diagram explaining a transmission order of a reference image for synchronization according to an exemplary embodiment.

FIG. 3 illustrates, as an example of the multi-display system, a video wall system in which several display devices are piled up to form a large screen and various images are displayed on the large screen through reception of divided images from a server. However, the present disclosure is not limitedly applied to a video wall, but may be applied to various multi-display systems that display one image or a plurality of images using a plurality of display devices.

Referring to FIG. 3, in a video wall including 5×5 display devices that are connected by pairs of input and output connectors, each of the display devices may receive a divided image that corresponds to the corresponding display device among the whole image from a server 10.

The first display device ① receives a divided image that corresponds to the first display device ① among the whole image from the server ①, and displays the received divided image simultaneously with outputting of the received divided image through the output connector that is located on the right side of the first display device ① as the reference image. The output reference image may be input through the input connector that is located on the left side of the second display device ② that is adjacent to the first display device ①.

Further, the second display device ② may extract synchronization information from the received reference image, and may synchronize the divided image with the same period as the reference image to display the synchronized divided image. At the same time, the second display device ② may output the received reference image through the output connector that is located on the right side of the second display device ②, and the output reference image may be input to the input connector that is located on the left side of the third display device ③ that is adjacent to the second display device ②.

According to this embodiment, in a state where the respective display devices are connected in series through the pairs of input and output connectors, the divided image that is input to the first display device is transmitted up to the $25^{th}$ display device as the divided images that are displayed on the respective display devices are being synchronized.

On the other hand, as another embodiment that is different from this embodiment, each of the respective display devices may transmit the divided image that is displayed on the corresponding display device to the next display device as the reference image.

However, the flow of the reference image as illustrated in FIG. 3 is merely exemplary, and the image signal that is input to the first display device may be transmitted to the $25^{th}$ display device after passing through the $10^{th}$ display device, the $11^{th}$ display device, the $20^{th}$ display device, the $21^{st}$ display device, the $22^{nd}$ display device, and the $19^{th}$ display device in order.

On the other hand, in an exemplary embodiment, video walls composed of a plurality of display devices may be implemented as video walls composed of various numbers (i.e., M×N) of display devices, including a 5×5 video wall, a 10×10 video wall, and the like.

Figure 4:
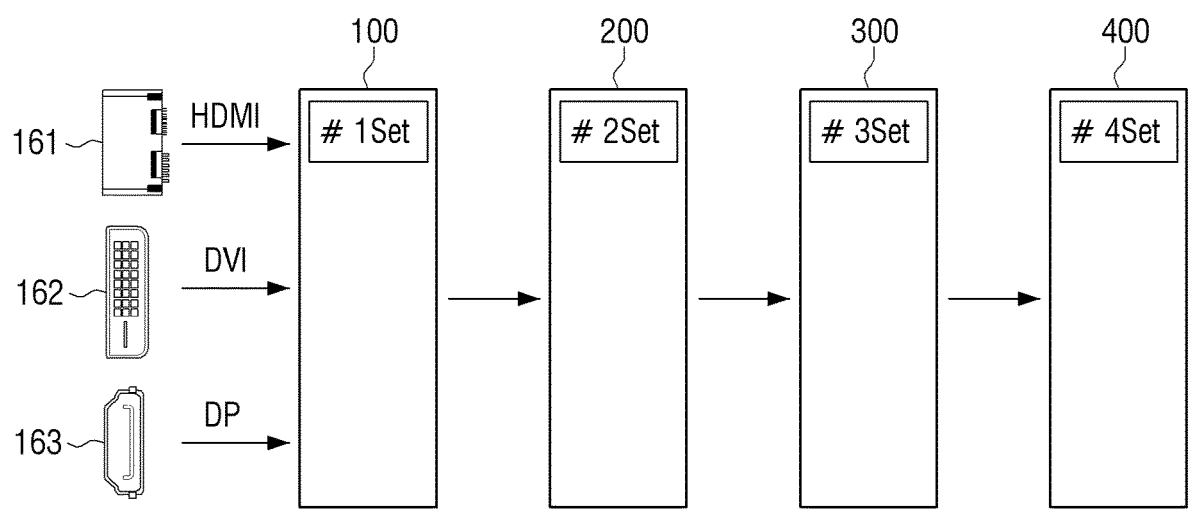
FIG. 4 is a diagram explaining the configurations of input and output connectors according to an exemplary embodiment.

FIG. 4 is a diagram explaining the configurations of input and output connectors according to an exemplary embodiment.

As illustrated in FIG. 4, reference numerals 100, 200, 300, and 400 indicate parts ("sets") of a plurality of display devices that constitute a multi-display system, and may correspond to respective display devices 100, 200, 300, and 400 that may sequentially receive, process, and output images. The respective display devices may successively receive the reference images and may perform synchronization for the divided images. Each of the respective display devices may include various types of input and output connectors, such as an HDMI connector 161, a DVI connector 162, and a DP connector 163.

Further, each of the display devices may receive various types of reference images that are input from the previous source device, convert the format of the input images, and transmit the converted images to the next display device. Specifically, each of the display devices may manage audio and video signals so that their types can be converted among HDMI, DVI, and DP, and for this, the display device may further include a conversion converter.

Figure 5:
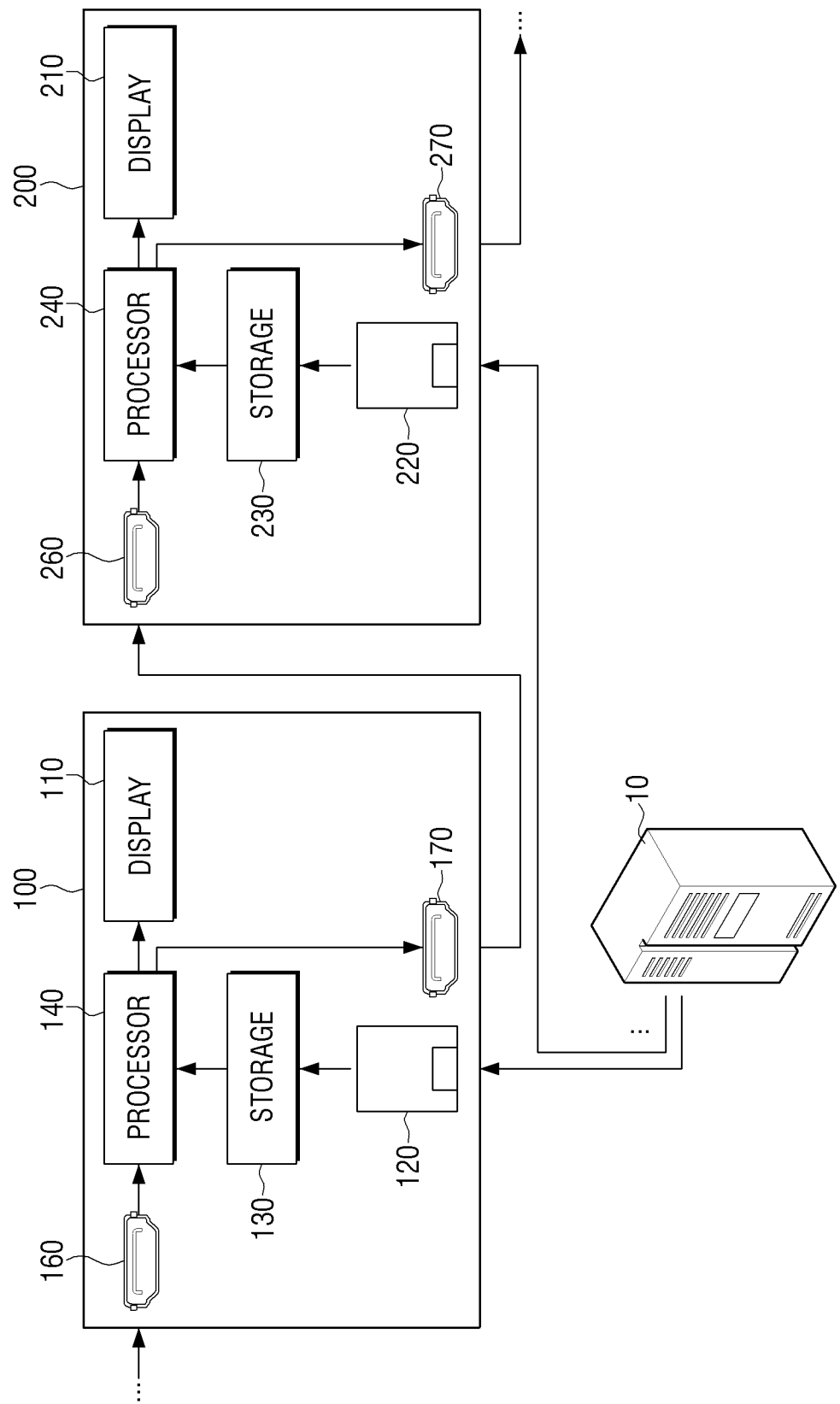
FIG. 5 is a diagram explaining a method for synchronizing output images using a reference image according to an exemplary embodiment.

FIG. 5 is a diagram explaining a method for synchronizing output images using a reference image according to an exemplary embodiment.

As illustrated in FIG. 5, a display device 100 synchronizes a divided image that is received from a server 10 with a reference image, and transmits the reference image to an adjacent display device 200.

Specifically, each display device of a multi-display system may be connected to the server 10 through a LAN (Local Area Network), and may be allocated with an IP address. The server 10 may transmit the divided image that corresponds to the corresponding display device using the allocated IP address.

A processor 140 of the display device 100 may receive a divided image through a communicator 120, and may store the received divided image in a storage 130. The processor 140 may receive the reference image from the previous display device connected through a first connector 160, and may extract at least one of vertical synchronization (V-sync) information, horizontal synchronization (H-sync) information, and clock information from the received reference image. The processor 140 may synchronize the stored divided image with the reference image using the extracted synchronization information, and may display the synchronized divided image through a display 110.

On the other hand, the display device 100 may display the divided image through synchronization of the divided image, and simultaneously transmit the reference image to the second display device 200 through a second connector 170. In this case, the reference image may be the reference image that is received through the first connector 160 or the divided image that is displayed on the display device 100.

In the same manner as the display device 100, the second display device 200 may receive the divided image that corresponds to the second display device 200 from the server 10 through the communicator 220 of the second display device 200. If the divided image is received, the second display device 200 may store the received divided image in a storage 230. A processor 240 may receive the reference image from the display device 100 that is connected through a first connector 260 of the second display device 200, and may extract at least one of vertical synchronization (V-sync) information, horizontal synchronization (H-sync) information, and clock information from the received reference image. The processor 240 may synchronize the stored divided image with the reference image using the extracted synchronization information, and may display the synchronized divided image through a display 210.

On the other hand, the display device 200 may display the divided image through synchronization of the divided image, and simultaneously transmit the reference image to the next-order adjacent display device through a second connector 270 of the second display device 200.

Figure 6:
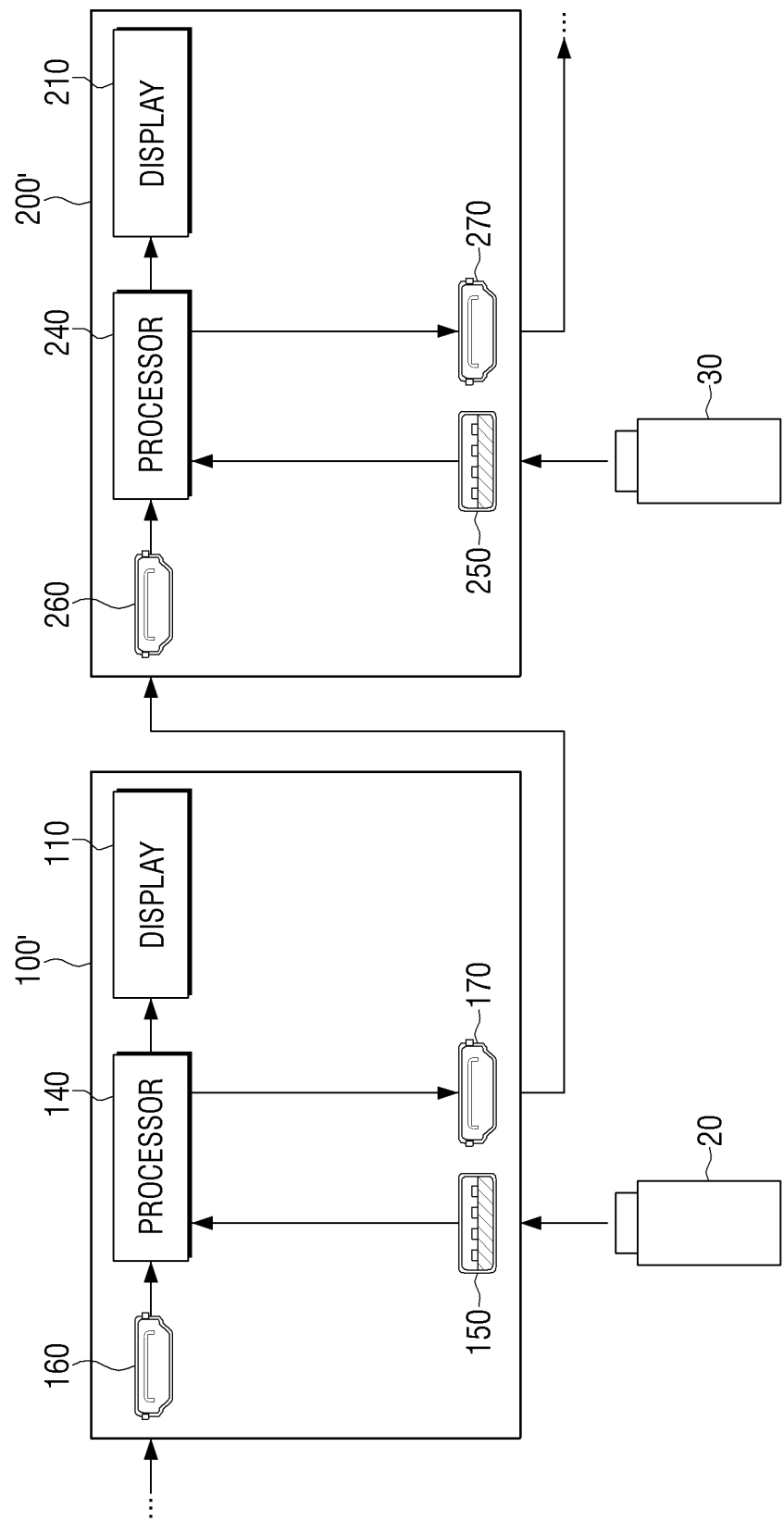
FIG. 6 is a diagram explaining a method for synchronizing output images using a reference image according to another exemplary embodiment.

FIG. 6 is a diagram explaining a method for synchronizing output images using a reference image according to another exemplary embodiment.

As illustrated in FIG. 6, a display device 100' does not receive a divided image from a server 10, but receives an input of a divided image from an external storage device 20. Accordingly, the display device 100' may be provided with an input terminal 150 for the external storage device 20 instead of a communicator 120 and a storage 130.

The input terminal 150 may receive an input of a divided image that is displayed on the display device 100' among a whole image that is displayed through a plurality of display devices of a multi-display system from the external storage device 20.

A next-order display device 200' that is adjacent to the display device 100' is also provided with an input terminal 250 for an external storage device 30, and each of the display devices of the multi-display system may receive an input of a divided image that corresponds to the display device from the external storage device.

Figure 7:
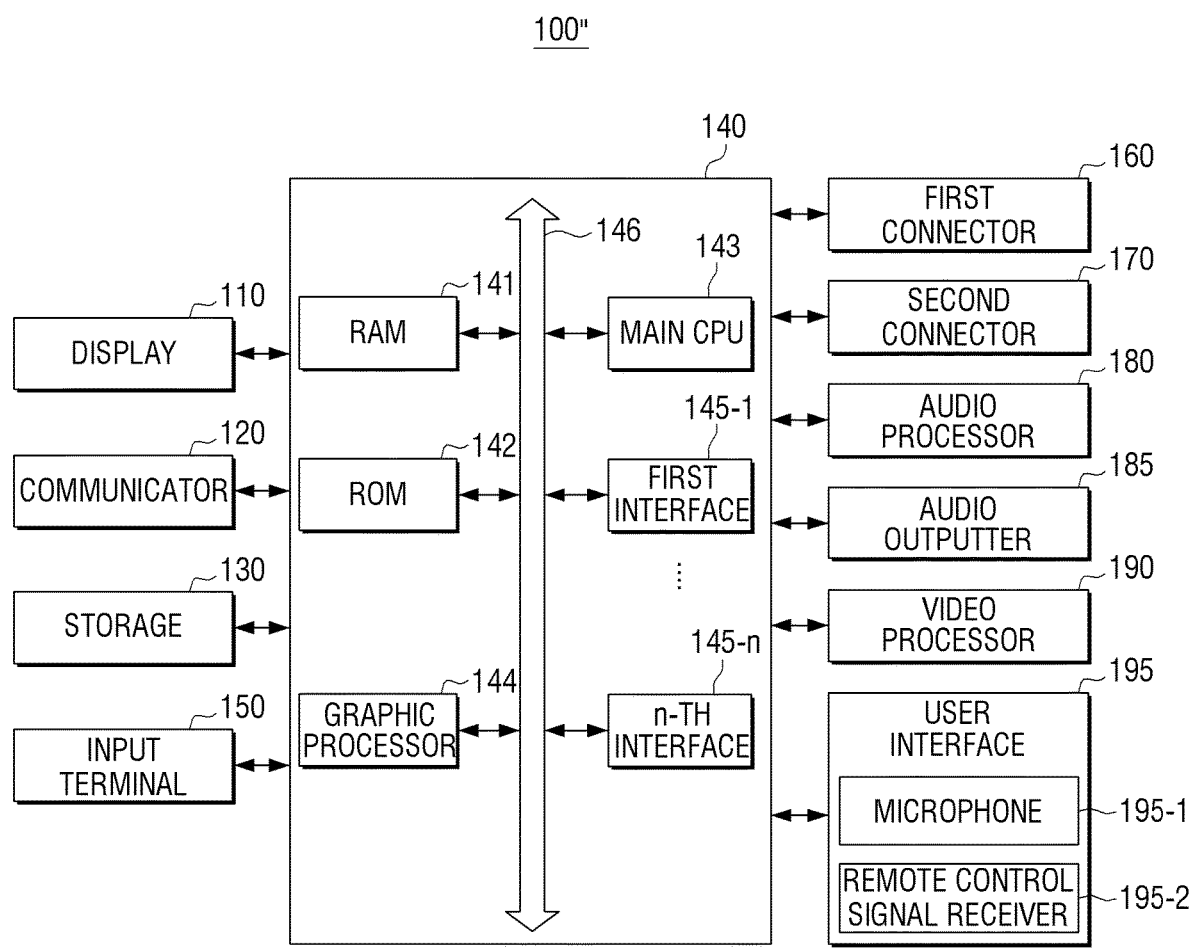
FIG. 7 is a block diagram illustrating in detail the configuration of a display device of a multi-display system according to another exemplary embodiment.

FIG. 7 is a block diagram illustrating in detail the configuration of a display device of a multi-display system according to another exemplary embodiment.

As illustrated in FIG. 7, a display device 100" according to another embodiment includes a display 110, a communicator 120, a storage 130, a processor 140, an input terminal 150, a first connector 160, a second connector 170, an audio processor 180, an audio outputter 185, a video processor 190, and a user interface. Hereinafter, explanation of the duplicate configurations in FIGS. 1 and 2 will be omitted.

The storage 130 may store various modules for driving the display device 100".

Specifically, the storage 130 may store a base module for processing signals transferred from respective pieces of hardware included in the display device 100", a storage module for managing a database (DB) or registries, a secure module, and a communication module.

The audio processor 180 is a constituent element that processes audio data.

The audio outputter 185 is a constituent element that outputs the audio data that is processed by the audio processor 180.

The video processor 190 is a constituent element that performs various image processes, such as input image decoding, scaling, noise filtering, frame rate conversion, and resolution conversion.

The user interface 195 is a constituent element that senses user interaction for controlling the whole operation of the display device 100". In particular, the user interface 195 may include various interaction sensing devices, such as a camera, a microphone 195-1, and a remote control signal receiver 195-2.

The processor 140 may control the whole operation of the display device 100" using various kinds of modules stored in the storage 130.

In the processor 140 as illustrated in FIG. 7, a random-access memory (RAM) 141, a read-only memory (ROM) 142, a main central processing unit (CPU) 143, a graphic processor 144, and first to n-th interfaces 145-1 to 145-n may be connected to one another through a bus 146.

The main CPU 143 accesses the storage 130 and performs booting using the operating system (O/S) stored in the storage 130. Further, the main CPU 143 performs various operations using various kinds of programs, content, and data stored in the storage 130.

The ROM 142 stores a set of commands for system booting. If a turn-on command is input to supply a power, the main CPU 143 copies the O/S stored in the storage 130 to the RAM 141 in accordance with the command stored in the ROM 142, and boots the system through execution of the O/S. If booting is completed, the main CPU 143 copies various kinds of application programs stored in the storage 130 to the RAM 141 and executes the application programs copied to the RAM 141 to perform various kinds of operations.

The graphic processor 144 creates a screen that includes various objects, such as icons, images, and texts, using an operator and a renderer. The operator operates attribute values, such as coordinate values on which the respective objects are to be displayed according to a layout of the screen, shapes, sizes, and colors. The renderer creates a screen having various layouts including the objects on the basis of the attribute values operated by the operator.

The first to n-th interfaces 145-1 to 145-n are connected to the various kinds of constituent elements as described above. One of the interfaces may be a network interface that is connected to an external device through a network.

Figure 8:
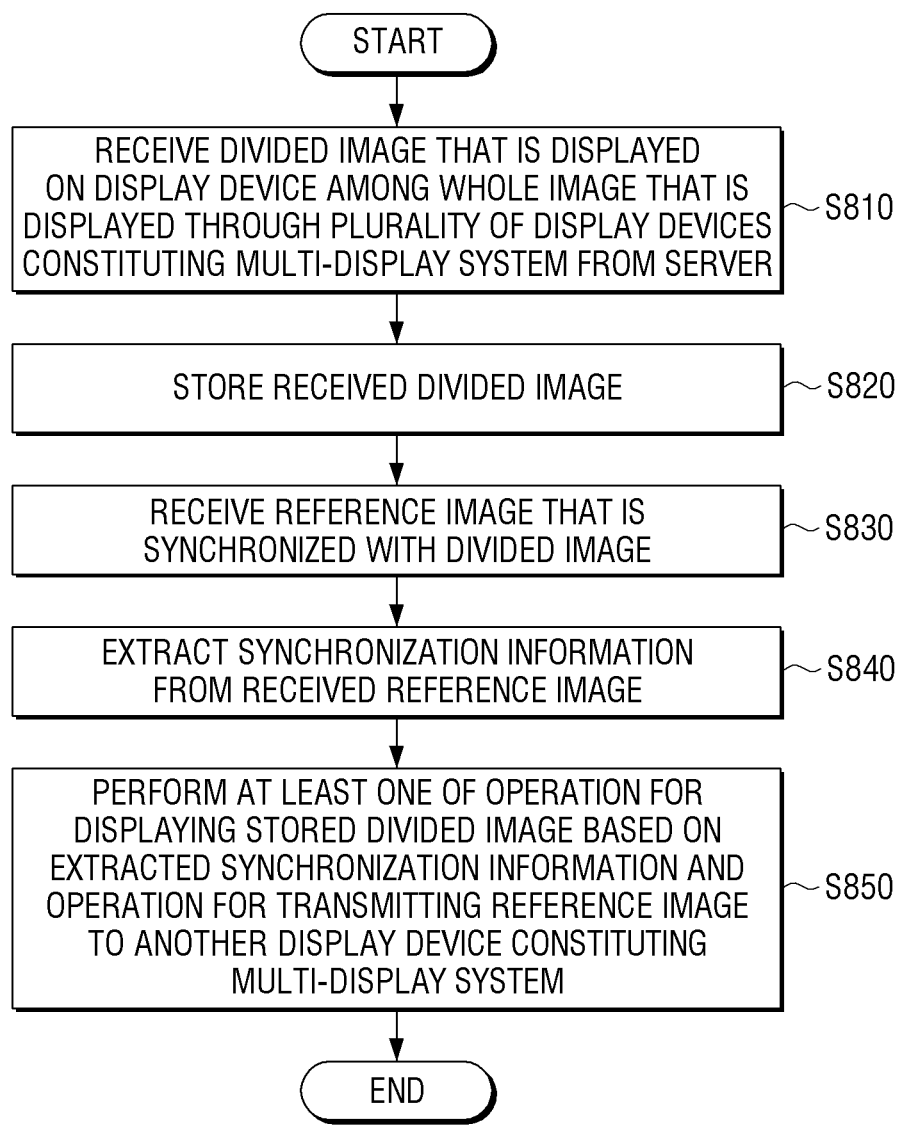
FIG. 8 is a flowchart explaining a method for controlling a display device of a multi-display system according to an exemplary embodiment.

FIG. 8 is a flowchart explaining a method for controlling a display device of a multi-display system according to an exemplary embodiment.

First, a divided image that is displayed on a display device 100 among a whole image that is displayed through a plurality of display devices of a multi-display system is received from a server 10 (S810).

Thereafter, the received divided image is stored (S820).

Thereafter, a reference image that is synchronized with the divided image is received (S830). Here, according to an exemplary embodiment, the reference image that is received from a first display device may be a divided image that is displayed on the first display device, and the reference image that is transmitted to a second display device may be a divided image that is displayed on the display device 100. Further, according to another exemplary embodiment, the reference image that is received from the first display device and the reference image that is transmitted to the second display device may be divided images that are displayed on the a display device in a first order among the plurality of display devices that successively transmit the reference images.

Thereafter, synchronization information is extracted from the received reference image (S840). Here, the synchronization information may include at least one of vertical synchronization (V-sync) information, horizontal synchronization (H-sync) information, and clock information.

Thereafter, at least one of an operation for displaying the stored divided image on the basis of the extracted synchronization information and an operation for transmitting the reference image to another display device constituting the multi-display system is performed (S850).

FIG. 9 is a flowchart explaining a method for controlling a display device constituting a multi-display system according to another exemplary embodiment.

First, a divided image that is displayed on a display device 100 among a whole image that is displayed through a plurality of display devices constituting the multi-display system is input from an external storage device (S910).

Thereafter, a reference image that is synchronized with the divided image is received (S920).

Thereafter, synchronization information is extracted from the received reference image (S930).

Thereafter, at least one of an operation for displaying the stored divided image on the basis of the extracted synchronization information and an operation for transmitting the reference image to another display device constituting the multi-display system is performed (S940).

As described above, according to the various exemplary embodiments, the respective divided images that are displayed on the display devices of the multi-display system such as the video wall can be synchronized with each other, and thus the step height phenomenon can be prevented from occurring due to mismatching of output periods of the respective divided images, and thus users can view the images smoothly.

The methods for controlling a display device of a multi-display system according to the various exemplary embodiments as described above may be implemented by a program and may be stored in various recording media. That is, a computer program that can execute the above-described various control methods through various kinds of processors may be stored in a recording medium to be used.

As an example, a non-transitory computer readable medium, which stores a program that includes receiving a divided image that is displayed on the display device among a whole image that is displayed through a plurality of display devices of the multi-display system from a server, storing the received divided image, receiving a reference image that is synchronized with the divided image, extracting synchronization information from the received reference image, and performing at least one of an operation for displaying the stored divided image on the basis of the extracted synchronization information and an operation for transmitting the reference image to another display device of the multi-display system, may be provided.

The non-transitory computer readable medium is not a medium that stores data for a short period, such as a register, a cache, or a memory, but means a medium which semi-permanently stores data and is readable by a device. Specifically, the above-described programs may be stored and provided in the non-transitory computer readable medium, such as, a CD, a DVD, a hard disc, a Blu-ray disc, a USB, a memory card, and a ROM.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display device of a multi-display system, the display device comprising:
   a display;
   a communicator configured to receive, from an external device, an image to be displayed on the display device, the image being one of a plurality of images into which a whole image is divided, wherein the whole image comprises the plurality of images that are displayed through a plurality of display devices included in the multi-display system;
   a storage configured to store at least one image comprising the received image; and
   a processor configured to:
      based on receiving, from a first display device of the multi-display system, a first reference image which is one of the plurality of images, obtain synchronization information from the first reference image, wherein the first reference image comprises an image displayed on the first display device,
      control the display to display the stored image that is synchronized with the first reference image based on the synchronization information, and
      control the communicator to transmit the displayed image as a second reference image to a second display device among the plurality of display devices of the multi-display system,
   wherein the first display device is different from the display device and the second display device, and
   wherein the first reference image is different from the second reference image.

2. The display device as claimed in claim 1, further comprising:
   a first connector connected to the first display device; and
   a second connector connected to the second display device,
   wherein the processor is further configured to receive the first reference image from the first display device through the first connector, and transmit the second reference image to the second display device through the second connector.

3. The display device as claimed in claim 2, wherein the display device is positioned adjacent to the first connector of the first display device and the second connector of the second display device.

4. The display device as claimed in claim 2, wherein the first connector and the second connector include at least one among a Display Port (DP) connector, a Digital Visual Interface (DVI) connector, or a High Definition Multimedia Interface (HDMI) connector.

5. The display device as claimed in claim 1, wherein the synchronization information comprises at least one among vertical synchronization (V-sync) information, horizontal synchronization (H-sync) information, or clock information.

6. A display device of a multi-display system, the display device comprising:

a display;

an input terminal configured to receive, from an external storage device, an input of an image to be displayed on the display device, the image being one of a plurality of images into which a whole image is divided, wherein the whole image comprises the plurality of images that are displayed through a plurality of display devices included in the multi-display system; and a processor configured to:
based on receiving, from a first display device of the multi-display system, a first reference image which is one of the plurality of images, obtain synchronization information from the first reference image, wherein the first reference image comprises an image displayed on the first display device,
control the display to display the image that is synchronized with the first reference image based on the synchronization information, and transmit the displayed image as a second reference image to a second display device among the plurality of display devices included in the multi-display system, wherein the first display device is different from display device and the second display device, and wherein the first reference image is different from the second reference image.

7. A method for controlling a display device of a multi-display system, the method comprising:

receiving, from an external device, an image to be displayed on the display device, the image being one of a plurality of images, wherein a whole image comprises the plurality of images that are displayed through a plurality of display devices included in the multi-display system;

storing the image;

based on receiving a first reference image that is one of the plurality of images into which the whole image is divided, obtaining synchronization information from the received first reference image, wherein the first reference image comprises an image displayed on a first display device; and displaying the stored image which is synchronized with the first reference image based on the obtained synchronization information, and transmitting the displayed image as a second reference image to a second display device among the plurality of display devices of the multi-display system, wherein the the first display device is different from the display device and the second display device, and wherein the first reference image is different from the second reference image.

8. The method as claimed in claim 7, wherein the receiving the first reference image comprises receiving the first reference image from the first display device through a first connector connected to the first display device, and the transmitting the second reference image comprises transmitting the second reference image to the second display device through a second connector connected to the second display device.

9. The method as claimed in claim 8, wherein the display device is adjacent to the first connector of the first display device and to the second connector of the second display device.

10. The method as claimed in claim 8, wherein the first connector and the second connector include at least one among a Display Port (DP) connector, a Digital Visual Interface (DVI) connector, or a High Definition Multimedia Interface (HDMI) connector.

11. The method as claimed in claim 7, wherein the synchronization information comprises at least one among vertical synchronization (V-sync) information, horizontal synchronization (H-sync) information, or clock information.

* * * * *